US008742663B2

(12) United States Patent  
Sroka

(10) Patent No.: US 8,742,663 B2  
(45) Date of Patent: Jun. 3, 2014

(54) TRANSFORMER AND LAMP BASE ELEMENT, LAMP BASE, AND DISCHARGE LAMP HAVING SUCH A LAMP BASE

(75) Inventor: Frank Sroka, Berlin (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 309 days.

(21) Appl. No.: 13/003,878

(22) PCT Filed: Jun. 25, 2009

(86) PCT No.: PCT/EP2009/057952  
§ 371 (c)(1),  
(2), (4) Date: Jan. 13, 2011

(87) PCT Pub. No.: WO2010/006911  
PCT Pub. Date: Jan. 21, 2010

(65) Prior Publication Data  
US 2011/0115374 A1    May 19, 2011

(30) Foreign Application Priority Data

Jul. 15, 2008  (DE) .......................... 10 2008 033 192

(51) Int. Cl.  
*H01J 7/44*  (2006.01)  
*H01R 13/46*  (2006.01)

(52) U.S. Cl.  
USPC ................... 315/57; 315/56; 315/70; 315/76; 315/77; 315/82; 336/65; 336/82; 336/90; 174/50; 174/54; 174/61; 174/63; 174/520; 313/42; 313/567; 313/623; 313/634; 313/636

(58) Field of Classification Search  
USPC .......... 315/56, 57, 70, 76, 77, 82; 336/65, 82, 336/90; 174/50, 54, 58, 61, 862, 63, 520; 313/42, 567, 623, 634, 636  
See application file for complete search history.

(56) References Cited

U.S. PATENT DOCUMENTS

| 6,356,180 | B1 | 3/2002 | Masuda et al. |
| 7,025,629 | B2 * | 4/2006 | Behr et al. .................. 439/571 |
| 7,131,184 | B2 | 11/2006 | Niggemeyer et al. |
| 7,135,822 | B2 * | 11/2006 | Behr et al. ..................... 315/57 |
| 7,915,828 | B2 | 3/2011 | Hamada |
| 2005/0046324 | A1 | 3/2005 | Behr et al. |

(Continued)

FOREIGN PATENT DOCUMENTS

| DE | 19521070 A1 | 12/1995 |
| DE | 20312503 U1 | 2/2004 |

(Continued)

OTHER PUBLICATIONS

International Search Report of PCT/EP2009/057952 issued on Oct. 21, 2009.

(Continued)

*Primary Examiner* — Douglas W Owens  
*Assistant Examiner* — Thai Pham

(57) ABSTRACT

In various embodiments, a lamp base element for holding a transformer is provided. The lamp base element may include a transformer chamber which holds the transformer, wherein the transformer is held completely in the transformer chamber, and wherein the contact pins of the transformer are passed through a contact-making face of the transformer chamber, which contact-making face is opposite an opening face.

6 Claims, 7 Drawing Sheets

(56) References Cited

U.S. PATENT DOCUMENTS

| | | | |
|---|---|---|---|
| 2006/0055340 A1* | 3/2006 | Burkhardt et al. | 315/276 |
| 2006/0262543 A1* | 11/2006 | Schmidt-Lehmann et al. | 362/368 |
| 2008/0055814 A1* | 3/2008 | Varga et al. | 361/247 |
| 2008/0150448 A1* | 6/2008 | Lerchegger et al. | 315/276 |

FOREIGN PATENT DOCUMENTS

| | | |
|---|---|---|
| DE | 102006014695 A1 | 10/2007 |
| EP | 1511130 A1 | 3/2005 |
| EP | 1511131 A1 | 3/2005 |
| JP | 10214736 A | 8/1998 |
| JP | 2000123628 A | 4/2000 |
| JP | 2001102142 A | 4/2001 |
| JP | 2005285368 A | 10/2005 |
| JP | 2006278056 A | 10/2006 |
| JP | 2006324250 A | 11/2006 |
| JP | 2007134098 A | 5/2007 |
| WO | 2004066686 A1 | 8/2004 |

OTHER PUBLICATIONS

English language abstract of DE 10 2006 014 695 A1.
English language abstract of DE 195 21 070 A1.
English language abstract of JP 2005/285368 A.
English abstract of JP 2000123628 A, dated Apr. 28, 2000.
English abstract of JP 2001102142 A, dated Apr. 13, 2001.
English language abstract of JP 2007134098 A of May 31, 2007.

* cited by examiner

TRANSFORMER AND LAMP BASE ELEMENT, LAMP BASE, AND DISCHARGE LAMP HAVING SUCH A LAMP BASE

RELATED APPLICATIONS

The present application is a national stage entry according to 35 U.S.C. §371 of PCT application No.: PCT/EP2009/057952 filed on Jun. 25, 2009, which claims priority from German application No.: 10 2008 033 192.9 filed on Jul. 15, 2008.

TECHNICAL FIELD

Various embodiments relate to a transformer, to a lamp base element having such a transformer, to a lamp base having such a lamp base element, and to a discharge lamp having such a lamp base.

Transformers such as these are used, for example, as starting transformers for production of high-voltage pulses for starting the gas discharge in the discharge medium in a high-pressure discharge lamp.

BACKGROUND

EP 1 511 131 A1 discloses a transformer which is held in a lamp base for a high-pressure discharge lamp. The transformer has a primary winding which is wound around a transformer housing, with the winding outgoers pointing away from the transformer housing. A secondary winding of the transformer is arranged within the transformer housing, with the winding outgoers being passed through the transformer housing to the outside. This has the disadvantage that the winding outgoers of the primary and secondary windings of the transformer have little mechanical stiffness and are therefore fitted in a costly manner, for protection against external mechanical influences, for example in so-called transformer trays, before being fitted in the lamp base. A further disadvantage is the high material costs, since the entire lamp base and the transformer are composed of a costly plastic which is resistant to high temperatures, because of the high temperatures which occur during operation of the high-pressure discharge lamp.

SUMMARY

Various embodiments provide a transformer, a lamp base element, a lamp base and a discharge lamp which can be produced cost-effectively and are robust against external influences.

The transformer according to the invention for fitting in a lamp base has a transformer housing which surrounds a transformer core, which is provided with a first winding. A second winding is arranged around the transformer housing and is fixed in an advantageous manner by means of at least one contact element on the transformer housing.

This solution has the advantage that the transformer is mechanically very strong, particularly with respect to the second winding, as a result of which the transformer can be treated as bulk goods.

The contact element is in the form of a contact pin which holds the transformer housing, preferably in a self-locking manner, in a holder. The second winding of the transformer can therefore be mechanically fixed by and in electrical contact with two contact pins, for example. This allows the second winding of the transformer to be fixed easily, with the second winding being very robust.

The second winding may be in the form of a flat ribbon winding and may have fixing recesses at respective winding ends, through which the contact pins are passed. A flat ribbon winding such as this can be produced and fitted to the transformer easily.

It is expedient if the contact pins each have a clamping collar approximately centrally, and the flat ribbon winding is arranged between the clamping collar and the transformer housing, by which means the flat ribbon winding is mechanically fixed extremely robustly.

The transformer housing advantageously has an approximately elliptical cross section, and the length of the transformer housing is greater than the maximum height.

In order to allow the transformer to be fitted easily to the lamp base, the contact pins may point radially outward in the same direction from the main apex of the transformer housing.

According to the invention, a lamp base element is provided for holding a transformer. This solution has the advantage that the lamp base element and the transformer are substantially mechanically decoupled from a lamp base as a separate component and, for example, can be produced from a cheaper plastic with a higher coefficient of thermal expansion.

In one preferred refinement, in order to protect the transformer, the lamp base element has a transformer chamber which holds the transformer completely.

In this case, the contact pins of the transformer can be passed through a contact-making face of the transformer chamber, which contact-making face is opposite an opening face, in order to allow contact to be made easily with, for example, a board.

In a further refinement of the invention, a center contact element is fitted in the transformer chamber such that a transformer contact area of the center contact element for making contact with the first winding, which is passed out of the transformer housing, of the transformer is arranged within the transformer chamber, and a further lamp contact area of the center contact element, in particular for making contact with a high-pressure discharge lamp, is arranged outside the transformer chamber.

Advantageously, a chamber internal area of the transformer chamber of the lamp base element is encapsulated with an encapsulation material after fitting of the transformer, for electrical insulation.

The encapsulation material is, for example, a low-cost silicone rubber.

Advantageously, the transformer chamber has an envelope surface which bounds the opening face and has two longitudinal faces and two lateral faces, with the faces being arranged substantially at right angles to one another.

In one advantageous refinement, the lamp contact area of the center contact element is held in a center contact ring, which is integrally formed on the longitudinal face centrally in the longitudinal direction of the longitudinal face of the transformer chamber, such that a ring axis of the center contact ring extends approximately parallel to the contact pins of the transformer, and a ring upper face ends approximately flush with the opening face of the transformer chamber. This makes it possible for the transformer to make contact easily with, for example, a high-pressure discharge lamp when the lamp base element is being fitted in the lamp base.

A funnel can be formed approximately at the center of the center contact ring and tapers along the ring axis, in the direction of the normal to the surface of the opening face pointing away from the transformer chamber, as far as the lamp contact area of the center contact element. By way of example, the funnel allows a power supply line to be held easily while a high-pressure discharge lamp is being fitted.

Advantageously, on an annular lower face, the center contact ring forms a ring spring and an annular energy direction transmitter which has a larger radius than the ring spring, in each case for connection to a lamp base. The energy direction transmitter can be used for easy ultrasound welding of the lamp base element to the lamp base.

On the contact-making face of the transformer chamber, the contact pins can be connected from the outside to contact plates, which provide flat contact-making capabilities, for example with a board.

The contact plates in each case project outward in places in the longitudinal direction of the transformer chamber and can thus easily be welded, for example to other elements, in this area.

Preferably, the contact plates each can have rims in places formed by fixing elements which project from lateral edges of the envelope surface, which can be used as protection, for example while the lamp base element is being fitted to the lamp base.

At least one alignment pin may be formed on the contact-making face of the lamp base element in order to allow the lamp base element to be fitted easily to the lamp base.

According to the invention, a lamp base has a mount plate, in particular for holding a high-pressure discharge lamp. In this case, a cylindrical center dome can be integrally formed on a mount face of the mount plate facing away from the high-pressure discharge lamp. In this case, the annular lower face of the lamp base element rests approximately on a center dome head face, and is fixed to the center dome. This solution results in a multi-part lamp base, which can be assembled easily and, for example, may be composed of different materials.

A plug socket can cost-effectively be formed integrally at the side on an envelope surface section which surrounds the mount plate in places.

In a further refinement of the lamp base, contact pins, which are embedded in the lamp base, of the plug socket project from the mount face and engage easily in recesses in a board which is arranged in the area of the mount plate, thus allowing the contact pins to be electrically and mechanically connected to the board.

The cylindrical center dome preferably extends through a board recess in the board.

The contact plates of the lamp base element can be electrically and mechanically connected to the board in order to make electrical contact with the transformer easily, and in order to fix the lamp base element to the lamp base.

Advantageously, the ring spring and the energy direction transmitter of the lamp base element are inserted into in each case one annular groove in the center dome, thus allowing the lamp base element to be connected to the lamp base extremely firmly by means of an ultrasound welding process.

By way of example, the center dome may have a power supply line channel, which opens into the funnel of the lamp base element in order, for example, to connect a power supply line, which has been inserted into the power supply line channel, of the high-pressure discharge lamp to the center contact element of the lamp base element.

The lamp base may be surrounded by a base cover, wherein the base cover forms a ring spring and an annular energy direction transmitter, which are in each case inserted into an annular groove in the lamp base element. The base cover can easily be connected to the lamp base by means of the ring spring and the energy direction transmitter.

It is expedient for the board to have expansion joints in the area of the contact pins of the lamp base element, thus making it possible to compensate easily for changes in the volume of the board and/or of the lamp base element as a result of temperature fluctuations.

In order to fix the position, at least one alignment pin on the lamp base element is inserted into at least one pin holder on the board.

A discharge lamp according to the invention which can be produced easily has the lamp base described above.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced.

Figure 1:
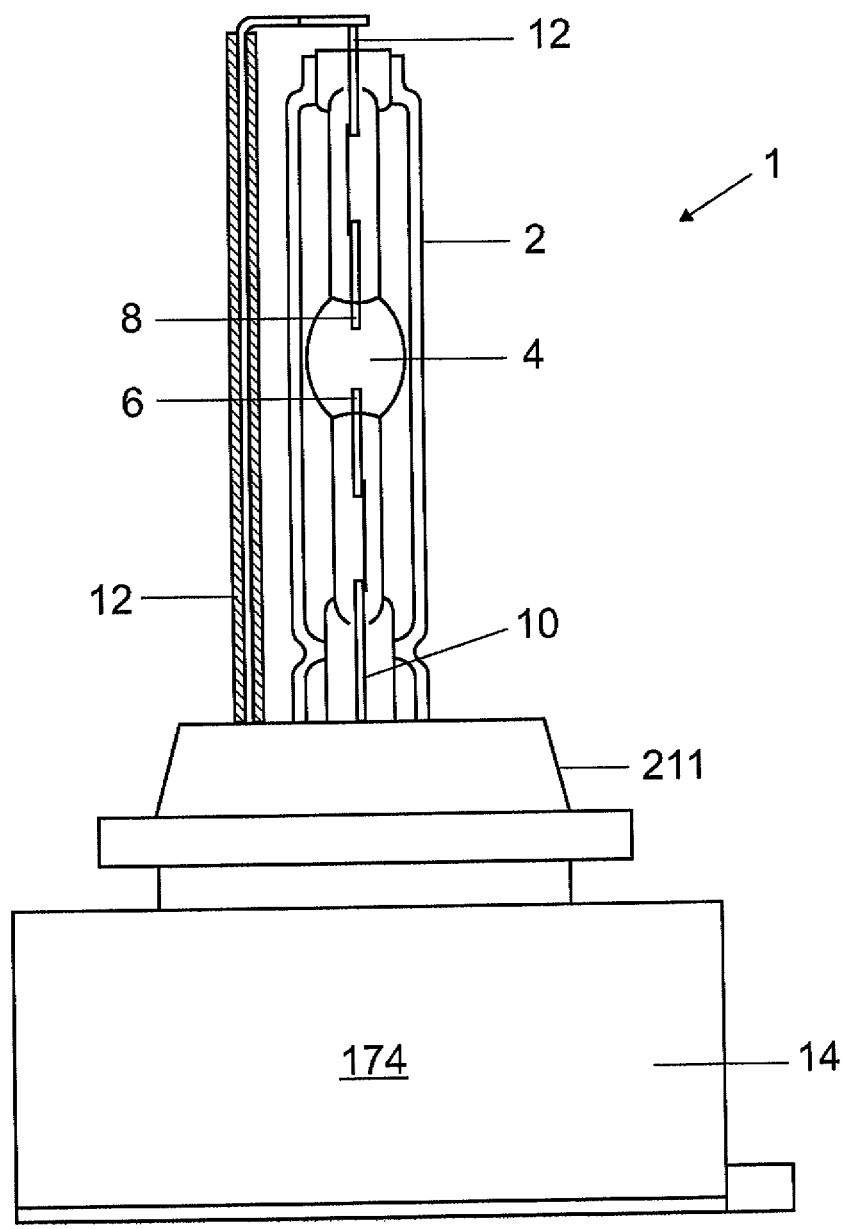
FIG. 1 shows a side view of a high-pressure discharge lamp according to one exemplary embodiment of the invention.

FIG. 1 shows a side view of a high-pressure discharge lamp 1 according to one preferred exemplary embodiment, which is preferably used for a motor vehicle headlight. This high-pressure discharge lamp 1 has a discharge vessel 4, which is surrounded by a glazed outer bulb 2 and is composed of quartz glass with electrodes 6, 8 arranged in it, in order to produce a gas discharge. The electrodes 6 and 8 are connected to a respective power supply line 10 or 12, which is passed out of the discharge vessel 4, in order to supply electrical power.

The outer bulb 2 and the discharge vessel 4 are fitted to a lamp base 14 which has a lamp base element, which is not illustrated in FIG. 1 but into which a transformer is inserted.

Figure 2:
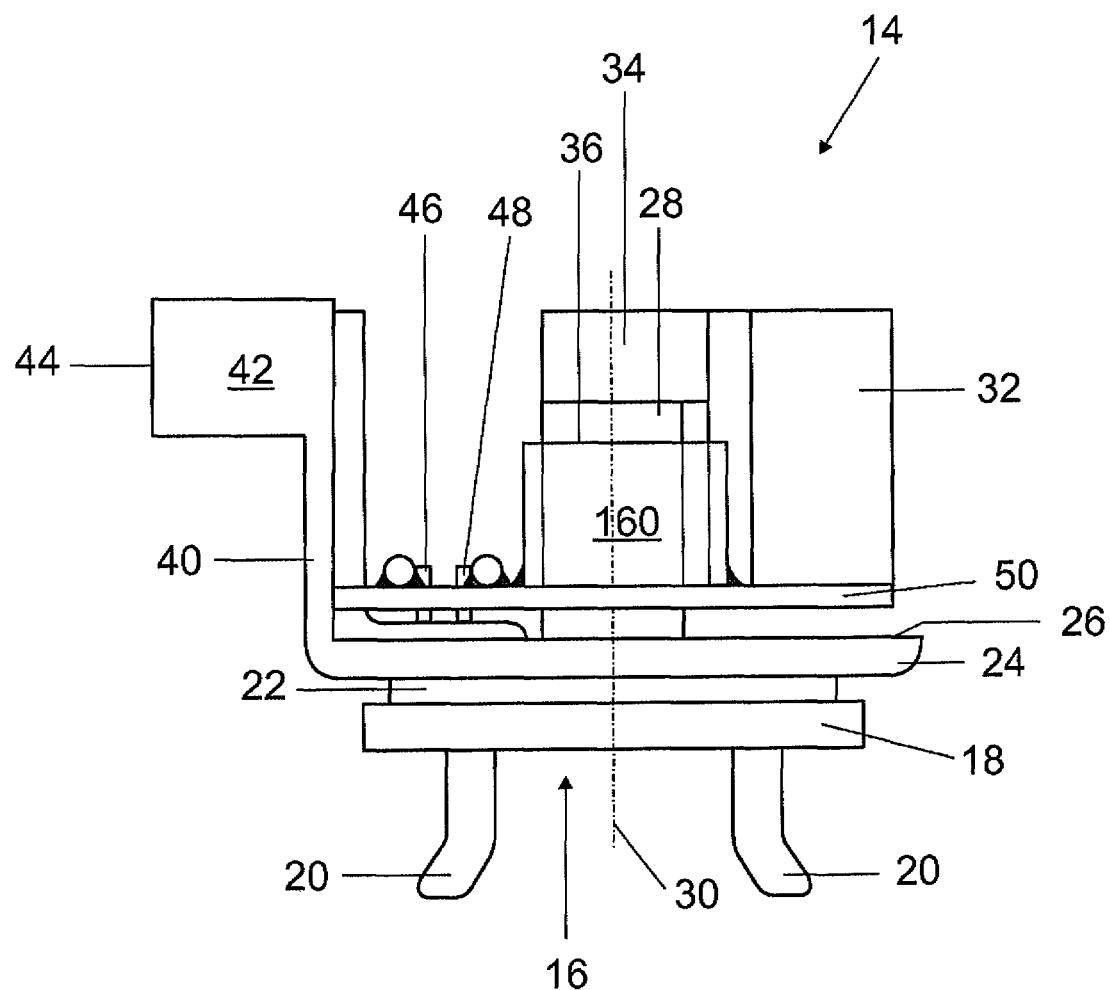
FIG. 2 shows a side view of a lamp base according to the exemplary embodiment.

FIG. 2 shows the lamp base 14 from FIG. 1, according to the exemplary embodiment, effectively upside down, showing the lamp base 14 without a base cover. On its lower base face 16 in FIG. 2, the lamp base 14 forms a reference ring 18 with holding lugs 20, which project downward, in order to fix the position of the high-pressure discharge lamp 1 from FIG. 1. The reference ring 18 is in this case connected to a mount plate 24 of the lamp base 14 via a cylindrical web 22 on the side opposite the holding lugs 20. On its mount face 26 facing away from the reference ring 18, the mount plate 24 has a cylindrical center dome 28, which is arranged centrally and extends substantially along the base longitudinal axis 30. A lamp base element or base element 32, which is explained in more detail in the subsequent FIG. 3, is connected to a dome end surface 36 of the center dome 28 via a center contact ring 34, which is formed on the base element 32.

The mount plate 24 has an approximately rectangular circumference, wherein a plug socket 42 is formed integrally on a left-hand envelope surface section 40 of the lamp base 14 in FIG. 2, in order to make electrical contact with the high-pressure discharge lamp 1. In this case, the plug socket 42 projects outward approximately at the same height as the center contact ring 34 of the base element 32. A plug holder of the plug socket 42 is accessible from the left-hand end face 44 of the plug socket 42 in FIG. 2. Contact pins 46, 48 are embedded in the lamp base 14, extend from the plug socket 42 over the envelope surface section 40 and the mount plate 24, and project substantially parallel to the base longitudinal axis 30 from the mount face 26 of the mount plate 24, approximately between the envelope surface section 40 and the center dome 28. The wire lengths of the contact pins may be different overall, as a result of which the right-hand contact pin 48 in FIG. 2 is, for example, further away from the envelope surface section 40.

A leadframe or a board 50 is arranged at a distance from and substantially parallel to the mount face 26 of the mount plate 24 of the lamp base 14 and has two recesses, which cannot be seen in this figure, through which the contact pins 46, 48 are passed, thus forming a so-called pin-in-hole connection between the board 50 and the contact pins 46, 48. The contact pins 46, 48 are in this case either inserted in a self-locking manner into the recesses in the board 50, or are additionally welded, for example, to the board 50. Centrally, the board 50 has a recess area, which likewise cannot be seen in this figure, through which the center dome 28 is passed. In addition to the contact pins 46, 48, the board 50 is fixed in a position by the base element 32, as will be explained in more detail below, in the following figures.

Figure 3:
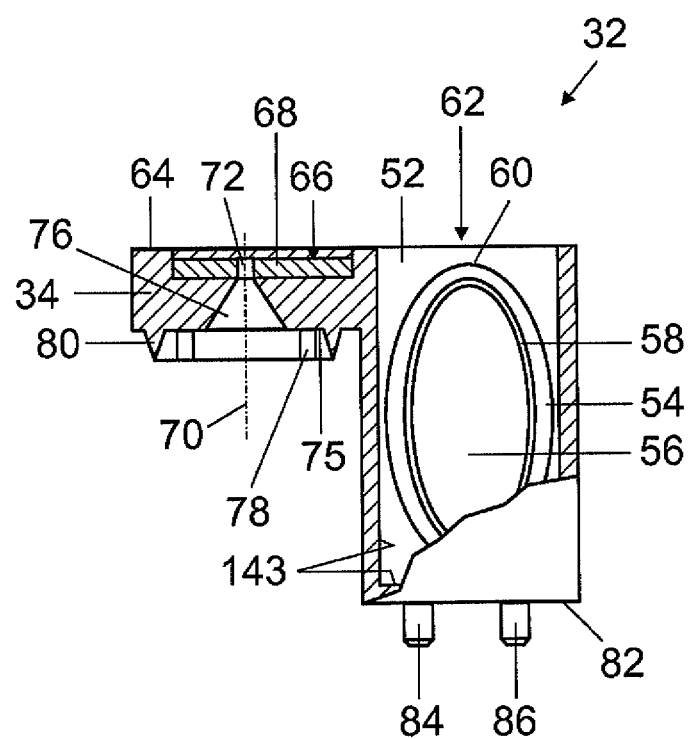
FIG. 3 shows a side view of a lamp base element according to the exemplary embodiment.

FIG. 3 shows the base element 32 according to the exemplary embodiment in the form of a side view, with parts of the drawing being illustrated sectioned. A transformer 54 is held completely in a transformer chamber 52 in the base element 32.

The transformer 54 has a transformer core 56, around which a first winding and secondary winding 58 are wound, with the secondary winding 58 and the transformer core 56 being surrounded by a transformer housing 60 which has an approximately elliptical cross section.

The transformer housing 60 is inserted into an opening face 62, which is located at the top in FIG. 3, of the transformer chamber 52. In this case, the opening face is located approximately in the same plane as the ring upper face 64 of the center contact ring 34 of the base element 32.

A center contact element 66 for making electrical contact with the high-pressure discharge lamp 1 shown in FIG. 1 and with the transformer 54 is embedded in the base element 32 such that a transformer contact area, which is not illustrated in this figure, of the center contact element 66, is arranged within the transformer chamber 52, in order to make contact with the secondary winding 58, which is passed out of the transformer housing 60, of the transformer 54, and a lamp contact area 68 of the center contact element 66 is arranged in the center contact ring 34. The arrangement of the center contact element 66 will be explained in more detail in the figures which are described further below. The center contact ring 34 is open toward the ring upper face 64 in the area of the lamp contact area 68 of the center contact element 66, for welding to the power supply line 10 of the high-pressure discharge lamp 1 from FIG. 1.

Furthermore, the lamp contact area 68 of the center contact element 66 has a through-opening 72, which extends along a ring axis 70 of the center contact ring 34, for the electrical supply line 10 from FIG. 1 to be passed through. A funnel 76, which extends along the ring axis 70 from a ring lower face 75 and tapers toward the through-opening 72 opens in the through-opening 72. The funnel 76 is used as a simple means for holding the electrical supply line 10 from FIG. 1 during the fitting of the high-pressure discharge lamp 1.

A ring spring 78, which in each case extends around the ring axis 70, and an annular energy direction transmitter 80, which has a larger diameter and a cross section in the form of a point, are formed on the ring lower face 75 of the center contact ring 34, for connection to the center dome 28 of the lamp base 14 from FIG. 2. The energy direction transmitter 80 is in this case used for ultrasound welding.

A contact-making face 82, which is opposite the opening face 62 of the transformer chamber 52, has two alignment pins 84, 86, which project downward in FIG. 3, are offset with respect to one another, and assist the process of fixing the base element 32 on the board 50 in FIG. 2.

By way of example, the base element 32 from FIG. 3 is a plastic injection-molded component composed of polyphenylsulfide (PPS).

Figure 4A:
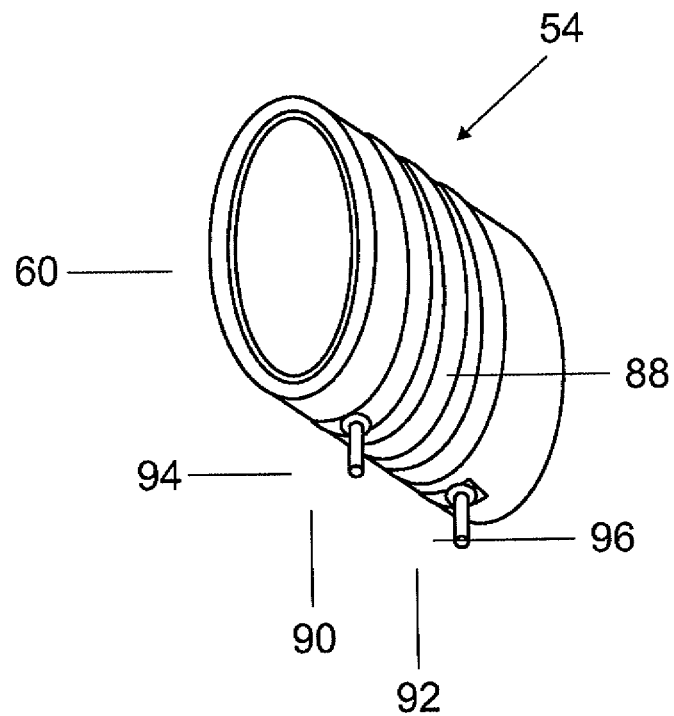
FIG. 4a shows a perspective view of a transformer according to the exemplary embodiment.

FIG. 4a shows a perspective view of the transformer 54. A flat ribbon winding which is wound around the transformer housing 60 and is composed of copper is used as a second winding or as a primary winding 88 of the transformer 54. It would also be feasible to use a round wire, rather than the flat ribbon, as the primary winding 88.

The transformer housing 60 has an elliptical cross section and has a length which is greater than the maximum height. Two contact pins 90, 92 project from a main apex of the transformer housing 60 radially outward in the same direction, wherein the contact pins 90 and 92 fix and make electrical contact with a respective winding end 94 or 96 of the primary winding 88 on the transformer housing 60.

Figure 4B:
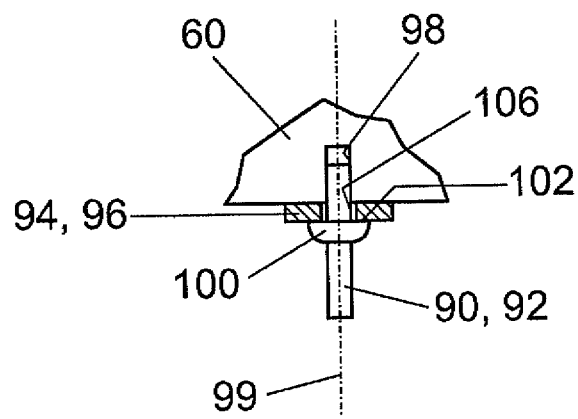
FIG. 4b shows a detail of the transformer from FIG. 4a, in the form of a section view.

FIG. 4b shows an enlarged cross-sectional view of a winding end 94, 96 with a contact pin 90, 92 from FIG. 4a. The contact pins 90, 92 are inserted into pin recesses 98 in the transformer housing 60, for example in a self-locking manner by means of an interference fit, or by adhesive bonding. A clamping collar 100 is formed approximately centrally with respect to a pin longitudinal axis 99 of the contact pins 90, 92 and has a clamping surface 102 which is approximately flat and is at right angles to the pin longitudinal axis 99 of the contact pins 90, 92. The winding ends 94, 96 of the primary winding 88 are in each case clamped in between the clamping surface 102 and the transformer housing 60. In this case, the winding ends 94, 96 each have a through-opening 106, through which the respective contact pins 90 and 92 are passed. For additional fixing, the winding ends 94 and 96 can be soldered to the respective contact pin 90 or 92. The winding ends 94, 96, and therefore the primary winding 88, are therefore fixed with a force fit, integrally and/or in an interlocking manner, and electrical contact is made with them, by means of the contact pins 90, 92. This allows the primary winding 88 to also be wound with less precision in comparison to the prior art during the manufacturing process, since it is no longer necessary to fix the primary winding 88 to the transformer housing 60 purely by means of the winding. Because of the contact pins, 90, 92, the primary winding 88 is extremely robust, and is very mechanically strong, as a result of which the transformer 54 can be treated like bulk goods and need not be held in so-called transformer trays for protection, as in the prior art, which trays result in high additional costs since, on the one hand, effort is required to fit the transformers to them and, on the other hand, they must be regularly cleaned in order to remove dust and material residues. The capability to treat the transformer 54 as bulk goods considerably reduces the transport and storage costs in comparison to the prior art, while handling during the manufacturing process is simplified and the production and assembly processes are more reliable.

Figure 5:
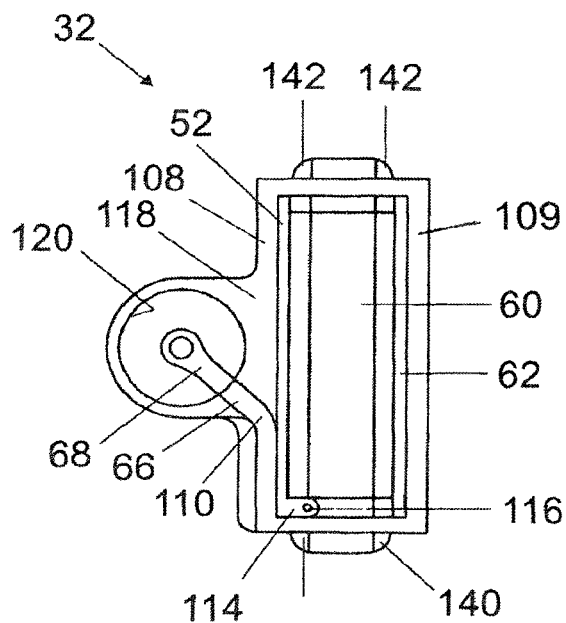
FIG. 5 shows a plan view of the lamp base element according to the exemplary embodiment.

FIG. 5 shows a plan view of the base element 32 in the direction of the opening face 62 from FIG. 3, according to the exemplary embodiment. This shows the arrangement of the center contact element 66. The envelope surface 109 of the transformer chamber 52 which bounds the opening face 62 has two longitudinal faces 108 and two lateral faces 112, 138, which are arranged substantially at right angles to one another. The lamp contact area 68, which is in the form of a tongue, of the center contact element 66 in this case, in FIG. 5, extends approximately obliquely downward to a longitudinal face 108 of the transformer chamber 52, on which the center contact ring 54 is formed. Adjacent to the lamp contact area 68, a center section 110 of the center contact element 66 is substantially embedded in the longitudinal face 108, and extends as far as a lower lateral face 112, in FIG. 5, of the transformer chamber 52. A transformer contact area 114 of the center contact element 66 projects on the longitudinal face 108 approximately along the lateral face 112 into the transformer chamber 52. In the area of the transformer contact area 114 of the center contact element 66, a winding end 116 of the secondary winding 58 (sec FIG. 3) is passed out of the transformer housing 60 and is electrically connected to the transformer contact area 114, for example in the form of a welded joint.

By way of example, the center contact element 66 is composed of X5CrNi1810, and is integrated as an insert part in the base element 32, which is produced by plastic injection molding.

As can be seen from FIG. 5, the center contact ring 34 is integrally formed substantially centrally in the longitudinal direction of the longitudinal face 108 of the transformer chamber 52. The area in which the center contact ring 34 is connected to the longitudinal face 108 is reinforced by a connecting web 118. The longitudinal face 108 of the transformer chamber 52 is broadened in the area of the center section 110 of the center contact element 66, in order to adequately embed the center contact element 66.

The center contact ring 34 has a circular inner section 120, which is stepped back from the ring upper face 64, thus exposing the lamp contact area 68 of the center contact element 66.

Figure 6:
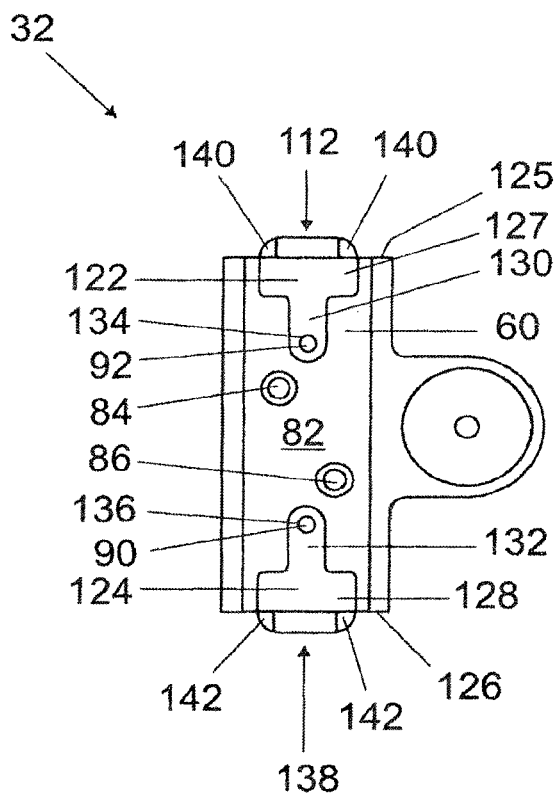
FIG. 6 shows a view from underneath of the lamp base element according to the exemplary embodiment.

FIG. 6 shows a view from underneath of the base element 32 according to the exemplary embodiment. This shows the offset arrangement of the alignment pins 84, 86 on the contact-making face 82 of the base element 32. Contact plates 122, 124 are arranged on the contact-making face 82 of the base element 32, in order to make electrical contact with the contact pins 90, of the transformer 54 from FIG. 4*a*. The contact plates 122, 124 are inserted into the contact-making face 82 such that the contact-making face 82 has an approximately flat surface, in particular for flat contact with the board 50 from FIG. 2. The contact plates 122 and 124 project outward from the base element 32 with a respective contact section 127 or 128 on the lateral edges 125 and 126 of the base element 32, in which case these contact elements 127, 128 are intended to be resistance spot-welded or laser-welded to the board 50 from FIG. 2. The contact pins 90 and 92 are passed through the contact-making face 82, and are respectively soldered to contact tongues 130 and 132, which face one another, on the respective contact plates 122 and 124. The contact tongues 130 and 132 have respective through-openings 134 and 136 in order to hold the contact pins 90, 92 in a simple manner. The transformer chamber 52 is hermetically sealed by the soldering of the contact pins 90, 92, see FIG. 5. The projecting contact sections 127 and 128 of the respective contact plates 122 and 124 are bounded in places at the side by fixing elements 140, 142 which are formed by lateral faces 112, 138 of the base element 32. The fixing elements 140, 142 provide better protection for the contact plates 122, 124 against mechanical loads which occur, for example, during fitting of the base element 32, thus allowing the base element 32 to be treated as bulk goods. The fixing elements 140, 142 can likewise be seen in FIG. 5. The contact plates 122, 124 are either fitted after the production of the base element 32 by plastic injection molding, or are alternatively also injection molded as insert parts.

The clamping collars 100 on the contact pins 90, 92, see FIG. 4*a*, are used not only for fixing the primary winding 88 but also as spacing elements for separating the primary winding 88, when inserted into the base element 32, from an inner wall 143 of the transformer chamber 52 in FIG. 3.

Because the contact pins 90, 92 are used to make contact between the contact plates 122, 124 and the primary winding 88 of the transformer 54 from FIG. 6, there is no longer any need for a laser welding process to the primary winding 88 in order to make electrical contact with, and to make a direct mechanical connection to, for example, the board 50 from FIG. 2, as in the prior art, since contact can be made between the primary winding 68 and the board 50 via the contact plates 122, 124. Because no laser welding process is involved, there is no need for the complex and costly process of coating the primary winding 88 with nickel, as required for the laser welding process.

In order to electrically insulate the transformer 54 in the transformer chamber 52 of the base element 32 from FIG. 3, the space between the inner wall 143 of the transformer chamber 52 and the transformer 54 is encapsulated with an encapsulation material, for example a low-cost silicone rubber, such as Elastosil RT 745 S, from Wacker Chemie. Before encapsulation, the base element 32 and the transformer from FIG. 3 are primed with a primary material, for example G790 from Wacker Chemie, which is intended for RTV2 silicones, and the winding end 116 of the secondary winding 58 from FIGS. 3 and 5 is soldered to the transformer contact area 114 of the center contact element 66. The encapsulation material may have ten times greater thermal expansion than the lamp base 14 from FIG. 2, for example, without any problems, since the base element 32 which holds the encapsulation material is very largely mechanically decoupled from the lamp base 14.

Figure 7:
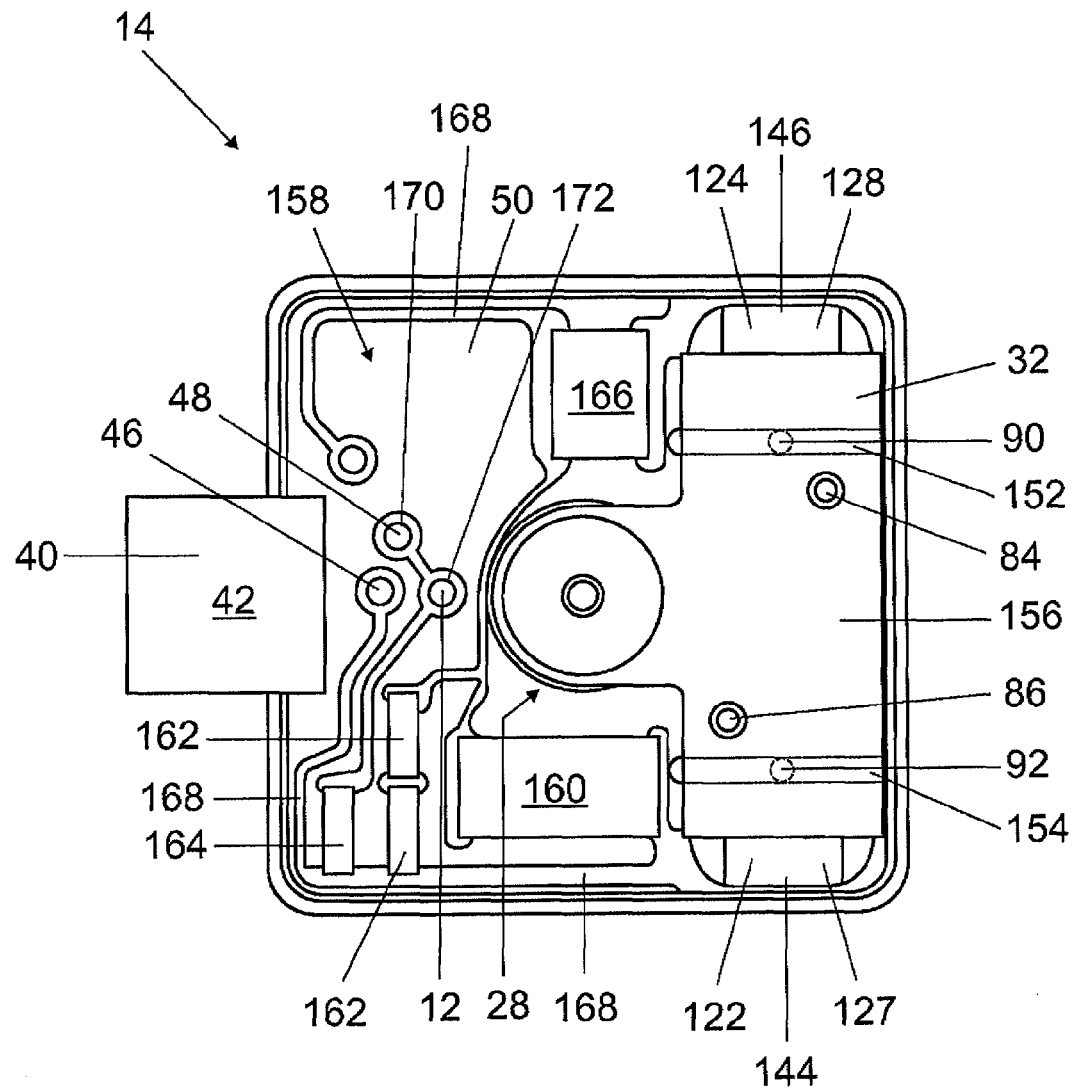
FIG. 7 shows a plan view of the lamp base according to the exemplary embodiment.

FIG. 7 shows a view from underneath of the lamp base 14 according to the exemplary embodiment, without a base cover, but with the board 50, the base element 32 and the plug socket 42. The base element 32 is welded to the board 50 by resistance spot-welding, or alternatively by laser welding, via the projecting contact sections 127, 128 of the contact plates 122, 124. The weld areas 144, 146 which are required for this purpose are in this case located between the contact-making face 82 of the base element 32 from FIG. 6 and the board 50, substantially in the area of the projecting contact sections 127, 128. The welding process on the one hand connects the base element 32 mechanically to the board 50, while on the other hand electrical contact is made between the primary winding 88 of the transformer 54 from FIG. 3 and the board 50.

The board 50 has expansion joints 152, 154 in the area of the contact pins 90, 92 of the base element 32. These expansion joints 152, 154 extend substantially by fingers at right angles from a right-hand board face 156 in FIG. 7 approximately in the area underneath the base element 32. By way of example, the expansion joints 152, 154 make it possible to compensate for changes in the volume of the board 50 resulting from temperature fluctuations during operation of the high-pressure discharge lamp 1 from FIG. 1, or expansions of the silicone encapsulation of the base element 32, which, for example, are transmitted to the board 50 via the welded contact sections 127, 128. A further function of the expansion joints 152, 154 is to make it possible for them to hold the contact pins 90, 92 if they project out of the contact-making face 82 of the base element 32, see FIG. 6, thus allowing the contact-making face 82 to rest in an approximately planar form on the board 50 in this case as well.

The interlocking connection of the alignment pins 84, 86, which are formed on the base element 32 and are arranged approximately in the vicinity of the weld areas 146, 148 in FIG. 7, to the board 50 makes it possible to remove the load on the weld areas 146, 148 from thermal and dynamic alternating forces between the base element 32 and the board 50.

In conjunction with FIGS. 7 and 2, it can be seen that a free space 158, which is easily accessible from the outside, is bounded substantially by the board 50, by the envelope surface section 40 of the lamp base 14, by the center dome 28 and by the base element 32. The board 50 can easily be fitted with electrical components via the free space 158. The electrical components used here are, for example, a capacitor 160, which is mounted on the board 50, somewhat underneath the center dome in FIG. 7, and, as can be seen from FIG. 2, is approximately half the height of the base element 32, resistors 162, a suppressor diode 164 and various other electronic components 166. Sufficient space is provided in the area of the free space 158, where the contact pins 46, 48 project out of the board 50 for, for example, a cutting blade with the diameter d=10 mm for cutting off various wires which project from the board 50. The generous dimensions of the board 50 and of the free space 158 mean that there is no need for the conductor tracks 168 to be passed through between, for example, components 160 to 166 and the board 50, because of the lack of space. Furthermore, the board 50 offers a considerable potential area for integration of further components, such as an inductor which is not illustrated but can be arranged between the contact-making points 170, 172.

The return conductor or the power supply line 12 of the halogen discharge lamp 1 from FIG. 1 is passed through the contact-making point 172 as a pin-in-hole connection, and is additionally welded via this to the board 50.

Figure 8:
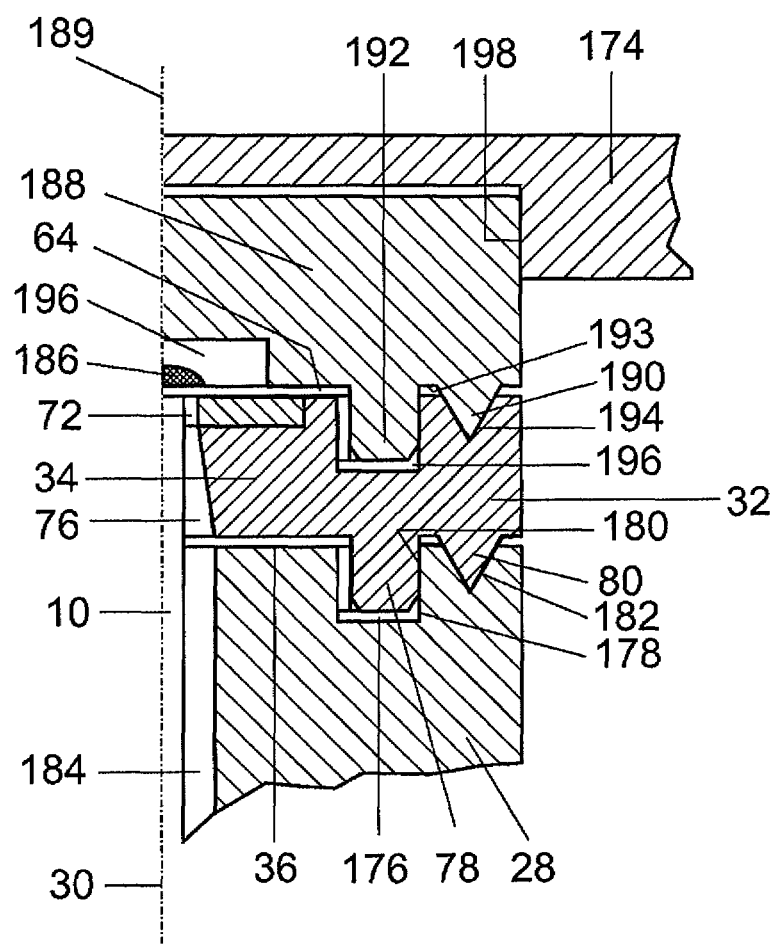
FIG. 8 shows a side view of the lamp base according to the exemplary embodiment.

FIG. 8 shows a side view of a cross section through the center dome 28, the base element 32 and a base cover 174 according to the exemplary embodiment, in order to show the connection between these components in more detail. In order to hold the ring spring 78 of the center contact spring 34 of the base element 32, the center dome 28 has an annular groove 176 on the dome end surface 36, which is designed such that, substantially, only a ring outer surface 178 of the ring spring 78 rests on a groove wall surface 180, thus forming a fit between the ring spring 78 and the annular groove 176.

The pointed energy direction transmitter 80 of the center contact ring 34 completely fills a holding groove 182, which is likewise formed in a pointed shape on the dome end surface 36 of the center dome 28. The center contact ring 34 can be welded to the center dome 28 by means of the energy direction transmitter 80, by an ultrasound welding process. The ultrasound welding leads on the one hand to the connecting point having a high resistance to high voltage, while on the other hand this makes it possible to achieve narrow geometric production tolerances. The load resulting from the high-frequency ultrasound oscillations acts only in the area of the center contact ring 34. The silicone encapsulation in the transformer chamber 52 from FIG. 3 is not also subject to ultrasound oscillations, because of its high inertia. The discharge vessel 4 from FIG. 1 is already fitted with the lamp base 14, as a result of which there is scarcely any interaction with the discharge vessel 4, because of the small amount of ultrasound energy that is introduced. As an alternative to ultrasound welding, the connection between the energy direction transmitter 80 and the holding groove 182 may also, for example, be in the form of an adhesive joint using a two-component epoxy resin such as DeloDuopox from Delo.

The center dome 28 in FIG. 5 has a power supply line channel 184 for holding the power supply line 10 for the discharge vessel 4 from FIG. 1, wherein the power supply line channel 184 extends along the base longitudinal axis 30 of the center dome 28 and opens toward the funnel 76 of the center contact ring 34. The power supply line 10 is in this case passed through the through-opening 72 in the center contact element 66 via the power supply line channel 184 and the funnel 76, is welded to the center contact element 66 by means of a weld peak 186, with electrical contact and a mechanical connection thus being made with and to it.

FIG. 5 shows only a detail of the base cover 174. This is in this case firmly connected to the center contact ring 34 via a cylindrical cover intermediate piece 188. The cover intermediate piece axis 189 in this case coincides approximately with the base longitudinal axis 30 of the center dome 28. An energy direction transmitter 190 and a ring spring 192, in a corresponding manner to that for the center contact ring 34, are formed on an intermediate piece lower face 193, facing the center contact ring 34, in order to connect the cover intermediate piece 188 to the base element 32. The energy direction transmitter 190 and the ring spring 192 are in this case held in a holding groove 194 and an annular groove 196, which are each formed on the ring upper face 64 of the center contact ring 34 and correspond to the holding groove 182 and the annular groove 176 in the center dome 28. The holding groove 194 and the annular groove 196 are illustrated only in this FIG. 8.

A holding area 196 on the cover intermediate piece 188 is stepped back centrally from the intermediate piece lower face 193, by means of which holding area 196 the weld peak 186 can be held, and is therefore kept at a distance from the cover intermediate piece 188. The welding to the weld peak 186 is isolated, such that it is resistant to high voltage, by the cover intermediate piece 188 and the base cover 174.

The cover intermediate piece 188 is plugged into a cylindrical recess 198 in the base cover 174, and is firmly connected to it, for example by adhesive.

The base cover 174 is composed of a low-cost plastic, for example PA66, and the cover intermediate piece 188 is composed of PPS, corresponding to the base element 32.

In order to close the lamp base 14, it is completely surrounded by the base cover 174, as can be seen in FIG. 1.

The populated board 50 in FIG. 7 is fixed via the pin-in-hole connections of the contact pins 46, 48 in the plug socket 42 and the power supply line 12 of the high-pressure discharge lamp 1 from FIG. 1, and the weld areas 144, 146 of the base element 32. There is no need for any so-called hot swaging in order to fix the board, as in the prior art.

Because of the simple and multi-part configuration of the lamp base 14, there are now virtually no tolerance chains that build up over three or four individual components of the lamp base 14, in comparison to the prior art.

A lamp base formed from a number of parts having a separate base element is disclosed, in which the base element holds a transformer in which at least one winding is fixed via a contact pin.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A lamp base element for holding a transformer, the lamp base element comprising:
   a transformer chamber which holds the transformer,
   wherein the transformer is held completely in the transformer chamber,
   wherein contact pins of the transformer are passed through a contact-making face of the transformer chamber, which contact-making face is opposite an opening face,
   wherein an envelope surface of the transformer chamber which bounds the opening face has two longitudinal faces and two lateral faces, which are arranged substantially at right angles to one another, and
   wherein the lamp contact area of the central contact element is held in a center contact ring, which is integrally formed on the longitudinal face centrally in the longitudinal direction of the longitudinal face of the transformer chamber, such that a ring axis extends approximately parallel to a contact pin of the transformer, and a ring upper face ends approximately flush with the opening face of the transformer chamber.

2. The lamp base element as claimed in claim 1,
   wherein a center contact element is fitted in the transformer chamber such that a transformer contact area of the center contact element for making contact with a first winding of the transformer, which is passed out of a transformer housing of the transformer is arranged within the transformer chamber, and a further lamp contact area is arranged outside the transformer chamber.

3. The lamp base element as claimed in claim 1,
   wherein a funnel is formed approximately at the center of the contact ring and tapers along the ring axis, in the direction of the normal to the surface of the opening face of the transformer chamber, as far as the lamp contact area of the center contact element.

4. The lamp base element as claimed in claim 1,
   wherein, on an annular lower face, the center contact ring forms a ring spring and an annular energy direction transmitter which has a larger radius than the ring spring, with a pointed cross section, in each case for connection to the lamp base.

5. The lamp base element as claimed in claim 1,
   wherein the contact pins are connected to contact plates from the outside on the contact-making face of the transformer chamber.

6. The lamp base element as claimed in claim 1,
   wherein at least one alignment pin is formed on the contact-making face of the lamp base element.

* * * * *

UNITED STATES PATENT AND TRADEMARK OFFICE
CERTIFICATE OF CORRECTION

| | | |
|---|---|---|
| PATENT NO. | : 8,742,663 B2 | Page 1 of 1 |
| APPLICATION NO. | : 13/003878 | |
| DATED | : June 3, 2014 | |
| INVENTOR(S) | : Frank Sroka | |

It is certified that error appears in the above-identified patent and that said Letters Patent is hereby corrected as shown below:

In the Specification

Column 7, line 57, delete "90, of" and write "90, 92 of" in place thereof.

Column 9, line 32, delete "dome in" and write "dome 28 in" in place thereof.

Signed and Sealed this
Twenty-seventh Day of January, 2015

Michelle K. Lee
*Deputy Director of the United States Patent and Trademark Office*